United States Patent
Hooper

[15] 3,656,013
[45] Apr. 11, 1972

[54] APPARATUS FOR GENERATING MOTIONAL ELECTRIC FIELD

[72] Inventor: William J. Hooper, Cuyahoga Falls, Ohio
[73] Assignee: Electrodynamic Gravity, Inc., County of Sarasota, Fla.
[22] Filed: Apr. 19, 1968
[21] Appl. No.: 722,587

[52] U.S. Cl..............................................310/10
[51] Int. Cl..............................................H02k 1/00
[58] Field of Search............310/10, 11, 178, 177, 156, 310/42, 268, 211, 169, 216, 269, 259; 103/1; 55/2, 14, 101, 123, 127, 120; 73/194 EM; 328/233–238

[56] References Cited

UNITED STATES PATENTS

| | | | |
|---|---|---|---|
| 3,285,179 | 11/1966 | Resler, Jr. | 103/1 |
| 3,336,489 | 8/1967 | Volger | 310/40 |
| 3,431,441 | 3/1969 | Shair | 310/11 |
| 399,800 | 3/1889 | Thomson | 310/115 |
| 460,087 | 9/1891 | Hewett | 310/46 |
| 2,066,343 | 1/1937 | Gillen | 310/46 |
| 2,558,540 | 6/1951 | Clos | 310/46 |
| 2,705,762 | 4/1955 | Pile | 310/104 |
| 3,277,631 | 10/1966 | Sunnen | 55/3 |
| 3,385,983 | 5/1968 | Bohn et al. | 310/11 |

OTHER PUBLICATIONS

Book–Theory and Calculation of Electrical Apparatus by C. P. Steinmetz; N.Y.– 1917.
Text Book– The Electromagnetic Field in its Engineering Aspects G. W. Carter– 2nd edition– 1967 pages 168 to 171 incl., 328, 329, 334, 335 and 336
The Feynman Lecture on Physics by Feynman, Leighton and Sands Addison– Wesley– Publishing Co., New York; pages 17–1 and 17–2

*Primary Examiner*—D. X. Sliney
*Attorney*—Oldham & Oldham

[57] ABSTRACT

Apparatus for producing and demonstrating properties of motional electric fields by means of rotating magnetic flux produced by a plurality of magnets extending parallel with the axis of rotation, said flux of these magnets being put into rotation about a common axis by mechanical or by electro magnetic means.

6 Claims, 11 Drawing Figures

Patented April 11, 1972 3,656,013

INVENTOR:
WILLIAM J. HOOPER

BY Oldham & Oldham
ATTORNEY,

Patented April 11, 1972

APPARATUS FOR GENERATING MOTIONAL ELECTRIC FIELD

This invention relates to the generation of motionally induced electric fields as distinct from electrostatic fields, and as distinct from the electric field (illustrated by transformer action) which is induced by the time rate of change of magnetic induction. Hence, all reference herein to a motional electric field means the electric field that is generated by the movement of magnetic flux.

The motional electric field generated by rotational motion of magnetic flux is non-uniform in both direction and radial intensity. Particles (large or small) of matter (solid, liquid or gaseous) which are within the ambit of this motional electric field are acted upon with a force which tends to accelerate them. It is well known that a particle carrying a charge $Q$ (coulombs) in an electric field of intensity $E$ (Newton/coulomb) will be acted upon by a force $F$ (Newton) given by the equation $F = EQ$. The electric intensity $E$ of a motional electric field is given by the vector equation $E = B \times V$, where $B$ is the magnetic flux density at a point in space, expressed in webers per square meter, and $V$ is the velocity of the moving magnetic flux at that point in space, expressed in meters per second. What is not so well known, however, is the fact that a non-uniform electric field exerts a force upon electrically neutral matter. In his celebrated text, "The Mathematical Theory of Electricity and Magnetism", Sir James H. Jeans describes, in the case of a non-uniform electrostatic field, how a "slab of dielectric will be sucked in between the plates of the condenser" thus demonstrating the mechanical force produced by such a field. He states (P. 125), "This, as will be seen later, is a particular case of a general theorem that any piece of dielectric is acted on by forces which tend to drag it from the weaker to the stronger parts of an electric field of force." According to Clerk Maxwell in "Electricity and Magnetism" (Vol. II, p. 181), Faraday discovered that the electric field due to electromagnetic induction penetrated within and throughout all materials. The motional electric field is just such a field. Apparatus for demonstrating the "general theorem", stated by Jeans, has, in the case of the non-uniform motional electric field, not heretofore been provided.

Accordingly, it is one of the objects of the present invention to provide a device for generating a non-uniform motional electric field whose force is of magnitude such that it can be sensed.

Since the motional electric field acts within and throughout all matter, such a non-uniform field will exert a physical force on any kind of electrically neutral matter, in a manner quite analogous to that of the electrostatic field with respect to dielectric material.

Another object of the invention is to provide apparatus for obtaining useful work from a non-uniform motional electric field.

The several objectives of the invention may be accomplished by rotating an elongate magnetic field about an axis which is concentric with the field and parallel with the field's elongation. For example, an array of magnets may be mounted on a rotor so that all magnets are parallel with the axis of the rotor, and all have the same polar orientation relative to the rotor. A solenoidal electro magnet, or another array of magnets, with magnetic axis concentric with the rotational axis may also be employed to enchance the flux density of the array of rotating magnets by flux linking with them. When such an array of magnets is rotated about the axis of the rotor, the magnetic field of each is rotated with it. As another example, an elongate magnetic field can be rotated about its axis, without mechanical movement, by the provision of stationary solenoidal electro magnets arrayed like the staves of a barrel and connected to a source of multi-phase alternating current (half wave rectified to prevent reversal of sign) in a manner comparable to the stator winding of a three-phase motor to produce "revolving field." While the composite magnetic field is thus in rotary motion, every charged, or uncharged particle of matter (solid, liquid, or gaseous) within the non-uniform motional electric field thus generated in the neighborhood of the rotor, will be acted upon by a force due to the electric intensity $E$. Positively charged particles will be forced in the direction of the vector $E$, negatively charged particles will be forced in the opposite direction, and electrically neutral matter will be pulled from the weaker regions of field intensity to the stronger regions. This latter mechanical force is called a differential force due to the action of the field on the internal electrical polarization of the neutral matter.

The three vectors $E$, $B$, and $V$ are always (with a possible exception) mutually at right angles to each other. If the thumb of the right hand is pointed in the direction of the magnetic flux density vector B, and then rotated like a right-handed screw so that it points in the direction of the velocity $V$ of the moving magnetic flux, then the forefinger of the right hand will point in the direction of the electric vector $E$. The rotation of the composite magnetic flux about its axis produces a motional electric field which will, except at the axial ends of the magnetic field, be quite generally directed radially with respect to the axis of rotation. The possible exception is the case of a magnet having a homogeneous electrically conductive core of perfectly circular cross-section, in which case the force of the electric field may be somewhat off radial.

With a given polar orientation of magnets relative to the axis of rotation, rotation of the magnetic field in a clockwise direction will generate a motionally induced electric field of sign (positive or negative) opposite that which is generated when the rotation is counterclockwise. For any given sense of rotation, reversing the polar orientation of the magnets relative to the axis of rotation likewise reverses the sign (positive or negative) of the motionally induced electric field. Reversing both the direction of rotation and the polar orientation of the magnets (a situation exemplified by viewing the apparatus first from one axial end, and secondly from the opposite axial end) produces no change in the sign (positive or negative) of the motionally induced electric field.

In the accompanying drawings, three embodiments of the invention are exemplified. Also, there are two model schematics to illustrate in its simplest form the principle of the invention, in which a plurality of commonplace permanent magnets are mounted upon a rotor.

The first embodiment is one in which an array of electro magnets is mounted on a rotor having a hollow center, through which particles of matter can be moved and their response to the motional electric field perceptibly demonstrated.

Second, there is an embodiment in which electro magnets are arrayed as in the first embodiment, but are stationary and their composite magnetic field is rotated electromagnetically by phase displacement.

Third, there is an embodiment in which a pair of oppositely rotating rotors, nested one within the other, are each provided, on its circumference, with an array of electro magnets oriented as aforesaid on each rotor, but oppositely oriented on the respective rotors, and wherein the effect of the motionally induced electric fields can be perceptibly demonstrated by the behavior of particles of matter externally of the rotor.

Figure 1:
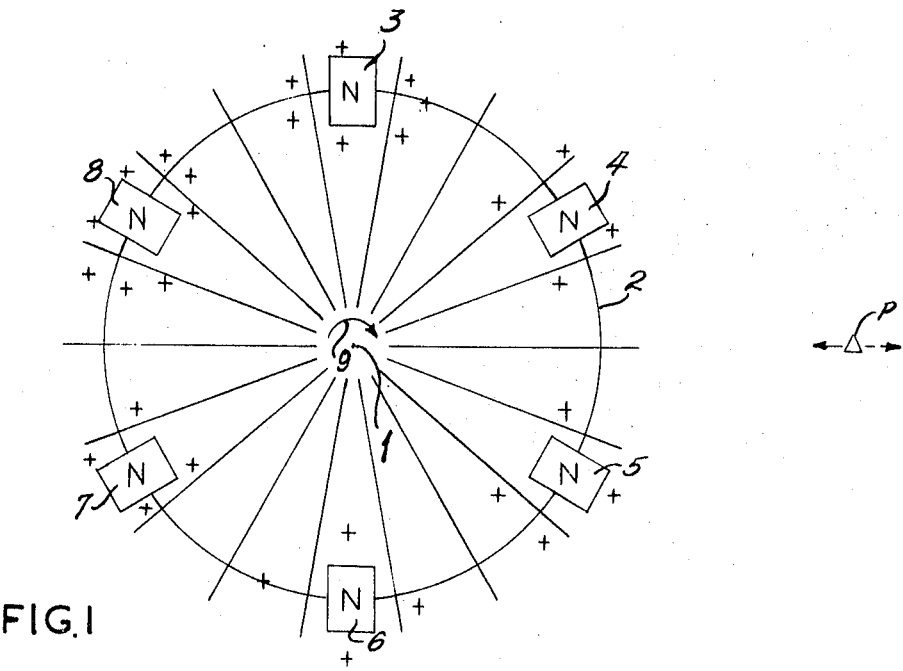
FIG. 1 is a diagrammatic view illustrating the effect of rotating an array of spaced permanent magnets about an axis which is parallel with each of the magnets when all magnets have corresponding polar orientation.
Figure 2:
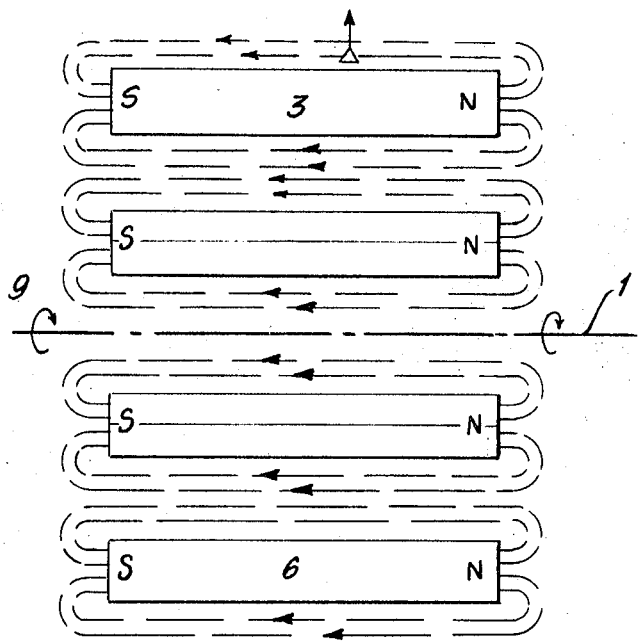
FIG. 2 is a diagrammatic view representing a side elevation of the arrangement shown in FIG. 1, and illustrating the external magnetic flux paths of the several permanent magnets.

In FIGS. 1 and 2, the principle of the invention is diagrammatically illustrated with the utmost simplicity, wherein a catena of magnetic flux fields, all with the same polar orientation, is produced by arranging an array of rod-type permanent magnets parallel with each other, and parallel with the axis about which they are to be rotated. In FIG. 1, the axis of rotation is designated 1, and may be considered as the center of a shaft of a rotor, preferably composed of material having low, if any, magnetic permeability, and low, if any, electrical conductivity. The periphery of such a rotor is designated by the circle 2. In the form shown, a series of permanent magnets 3, 4, 5, 6, 7, and 8 is appropriately secured to the periphery of the rotor with the respective magnets in equi-spaced relationship, and all with their north poles addressed in the same direction which, as shown in FIG. 1, is in the direction of the reader or, as shown in FIG. 2, to the reader's right. The external flux fields from the respective permanent magnets 3, 4, 5, and 6 are illustrated in FIG. 2, where it will be observed that the external flux path of all magnets is from right to left, a relationship designated by the plus (+) marks in FIG. 1. With such an arrangement, the flux fields of all magnets may be concurrently rotated about axis 1. Considering the rotation to be in the direction of arrows 9 and the polar orientation of the several permanent magnets to be as illustrated, a B × V motional electric field will be generated both externally and internally of rotor periphery 2 upon rotation of the rotor. The thus generated motional electric field will exert a radially directed force upon every particle of matter, neutral or charged, such as particle P, which is within the ambit of the catena of magnetic flux fields. The magnitude of the so impressed electric field intensity will depend upon the magnetic flux concentration at the particle P and the relative velocity between the flux field and particle P. While, if particle P is in motion, its velocity must be considered in arriving at the relative velocity V (in the formula $E = B \times V$) the disclosure will be simplified if the particle P be considered as stationary, and in such event V will be 2 R times S, where R is the radial displacement of particle P from axis 1, and where S is the revolutions per unit of time made by the rotor. Hence, with the particle P stationary, the magnitude of the force impressed upon it is increased when the speed of rotation of the rotor is increased at a given flux density; and is increased by an increase in the flux density at a given speed of rotation. The direction in which the force of the motionally induced electric field acts upon particle P is always perpendicular to the magnetic flux field B and to its velocity V. The sign of the electric force field may be either positive (acting radially outward from the axis of rotation) or negative (acting radially inward toward the axis of rotation), which, for any given polar orientation of the permanent magnets, may be reversed by reversing the direction of rotation of the rotor. With the polar orientation shown in FIGS. 1 and 2, and the direction of rotation indicated by arrow 9, if particle P is a proton or a positively charged molecule, the force of the B ×V electric field will be radially inward as indicated by the solid line arrow attached to particle P; but if particle P is an electron or a negatively charged molecule, the particle will tend to move radially outward as shown by the broken line arrow; and if the particle P is electrically neutral, it will tend to move in the direction of increasing electrical intensity E. Increase of E requires either that both B and V be increasing or that one be increasing at a sufficiently greater rate than the other is decreasing so that the product ($B \times V$) increases. In the relationship of field and particle shown in FIG. 1, the product ($B \times V$) increases radially inward.

For practical purposes, however, commonplace permanent magnets produce insufficient flux density in their external flux paths to impress upon a particle of charged matter such as P, an electric force of sufficient magnitude that the force of the electric field can be measured with ease, at least at speeds of rotation within practical limits. Consequently, the practical embodiments of the invention, later to be described, make use of electro magnets of a form capable of producing external flux fields of vastly greater flux density B, as well as higher velocities V.

The term "unipolar induction" has been used to indicate the induction of an electric field in the vicinity of an axially symmetrical magnetic system rotating about its axis of symmetry. There has been disagreement about whether as the magnetic system is rotated the lines of magnetic induction are carried with it or remain stationary while the magnetic system rotates through them. For example, when a bar magnet is rotated about its magnetic axis, it is believed by many that the magnetic field is stationary. I have demonstrated that under certain conditions, at least, the magnetic lines can be made to move, and I have devised certain methods and apparatus for utilizing this phenomena as in the production of localized and high intensity electric fields.

Figure 11:
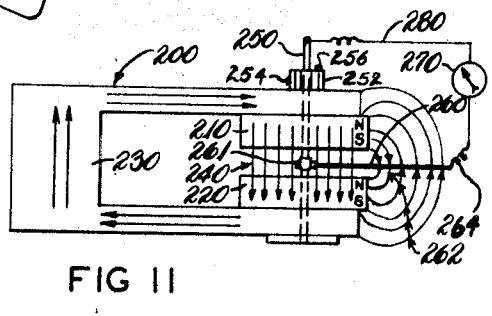
FIG. 11 is a diagrammatic illustration of an apparatus for exhibiting moving field phenomena.

Turning now to FIG. 11 of the drawings, an apparatus for demonstrating certain magnetic phenomena is illustrated in diagrammatic form. A magnetic system, indicated generally by numeral 200, includes a pair of permanent magnets 210 and 220 which are axially magnetized and mounted in axial alignment between the ends of a U-shaped yoke 230 of highly permeable magnetic material. The adjacent surfaces of magnets 210 and 220 being of opposed polarity are spaced apart, providing an air gap 240 therebetween. The lines of magnetic flux are shown in the drawing and indicated generally by numeral 262. A brass rod 250 extends axially through magnets 210 and 220. The magnetic system 200 is rotatable about rod 250. A stiff conductor 260 is electrically connected by a collar 261 at one end in rotatable or fixed relation as selectively desired, with the brass rod 250 at a point in the gap 240 between magnets 210 and 220. The other end of conductor 260 extends substantially perpendicularly from rod 250 to a distance in space away from the magnets and yoke where the magnetic field falls to approximately zero intensity. In order to complete an electrical circuit through galvanometer 270 and conductor 280 to the brass rod 250 and conductor 260, a flexible and extensible electrical wire 264 connects the end of conductor 260 to the galvanometer 270. A gear 252 locked alternatively by set screw 254 to rod 250 or by set screw 256 to yoke 230 can serve to provide driving motion to either the rod 250 or YOKE 230 as selectively desired. Normally, for the purposes of the experiment, the driving motion will be reciprocal because of the connection of wires 280 and 264.

With this apparatus, if the magnetic system 200 is held fixed and a given angular displacement imparted to conductor 260 by rotating it horizontally about or with rod 250 through the air gap at a given angular speed, a voltage is induced which provides a deflection of galvanometer 270. Furthermore, when the conductor 260 is held fixed and the magnetic system 200 rotated through the same angular displacement about rod 250, at the same given angular speed, a similar voltage of exactly the same magnitude but opposite direction is induced in the galvanometer circuit. The same deflection is obtained whether or not the magnets 210 and 220 rotate with the yoke 230 or are held stationary while the yoke alone is rotated. This indicates clearly that the lines of magnetic induction in the quantity rotate about the axis of rotation 250 as if they were rigidly attached to the magnetic system 200.

A most important aspect of the operation of the apparatus of FIG. 11 is noted when the magnets 210 and 220 are held fixed in relation to the conductor 260 and rod 250 and the yoke 230 is rotated about the rod 250. This action causes induction of current in the galvanometer circuit exactly as occurs when the entire magnetic structure or the conductor itself are moved. However, if the magnetic yoke 230 and conductor 260 are held fixed and magnets 210 and 220 rotated, there is no deflection of the galvanometer. Thus, it appears that the yoke structure plays an important part in controlling movement of the magnetic flux. Furthermore, it should be noted that the magnetic flux does not link the galvanometer circuit in the usual sense that this term is used, but that a current is induced in the galvanometer circuit through the action of the conductor 260 in merely cutting across the field extending between adjacent faces of magnets 210 and 220.

It has also been found that the permanent magnets 210 and 220 may be replaced by an electromagnet and the results described above duplicated. Furthermore, it can be demonstrated that the magnetic flux within the air core of a solenoid may be rotated about its magnetic axis. A brass tube formed in the shape of a toroidal C has a winding applied to its entire length with holes drilled in the tubing to receive a brass rod, as 250 in the structure shown in FIG. 11. With the winding energized, the above-described procedures produce similar galvanometer deflections.

This application is concerned with certain methods and apparatus which make use of the phenomena described above.

Figure 3:
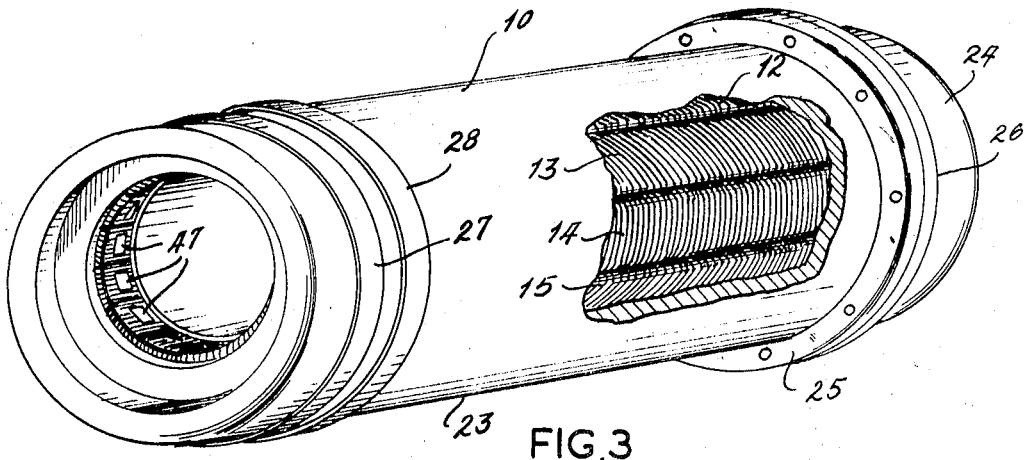
FIG. 3 is a perspective view of a rotor for generating a radially directed motional electric field in accordance with one embodiment of the invention, wherein electro magnets are arrayed within a hollow rotor with axes parallel to that of the rotor.
Figure 4:
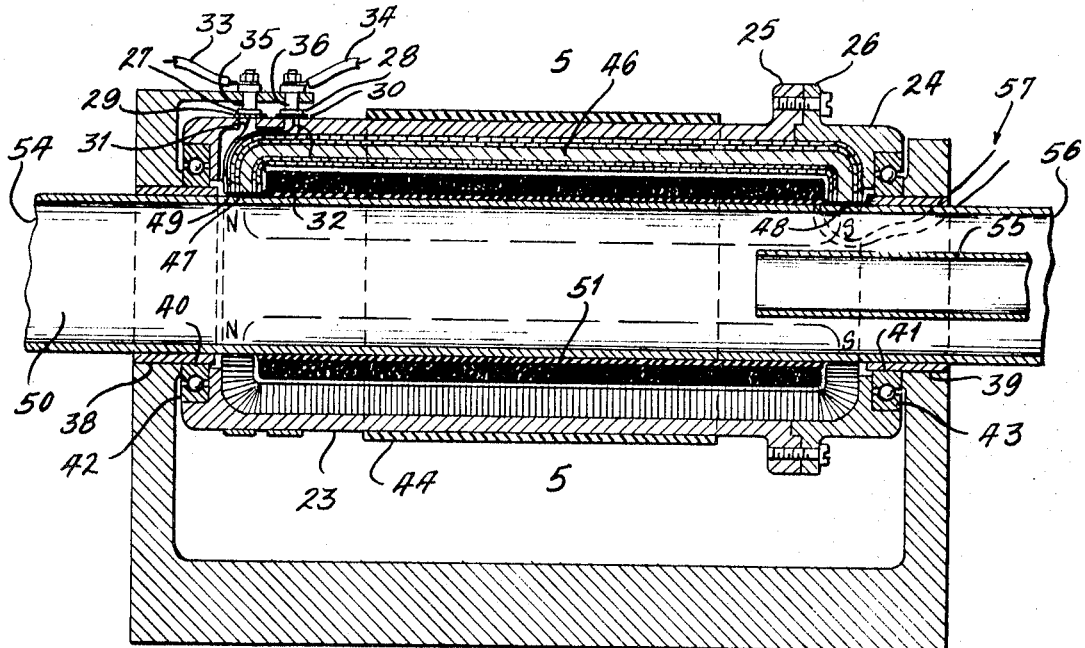
FIG. 4 is a sectional view taken along a diametric plane of the rotor shown in FIG. 3, together with its cooperating parts.
Figure 5:
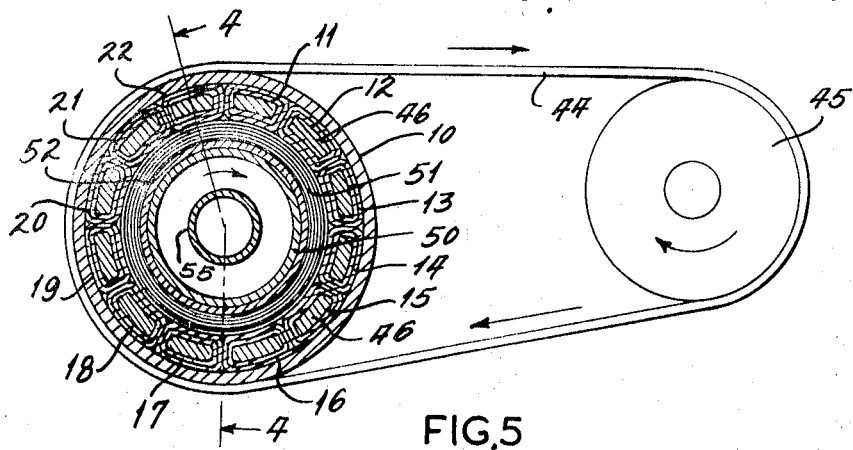
FIG. 5 is a sectional view along line 5—5 of FIG. 4, and showing, in addition, driving means for the rotor.

Referring now to FIGS. 3, 4, and 5 for an illustration of the second embodiment, a tubular rotor 10 is provided on its inner periphery with 12 keystone cross-sectional electro magnets 11, 12, 13, 14, 15, 16, 17, 18, 19, 20, 21, and 22 of the solenoid type. As seen in the cross-section of FIG. 5, the several electro magnets are arranged as sectors of a cylindrical annulus. While in the form shown, the several electro magnets 11-22 are shown in circumferentially wedged relationship, whereby to minimize the likelihood of relative movement radially inward as at standstill, as well as in the interest of achieving substantial uniformity of external flux density throughout the inside circular area of the rotor, it will be understood that when and if desired, the several electro magnets can be circumferentially spaced one from the other, and, if desired, a spacer of relatively low, if any, magnetic permeability interposed between them. Any suitable means may be employed for securing the several electro magnets to the shell of the rotor.

In order to facilitate the assembly of the several keystone-shaped electro magnets on the interior of the rotor as shown, the shell thereof is made of at least two pieces 23 and 24. In the form shown in FIGS. 3-5, the two pieces 23 and 24 are cup-shaped, and are respectively provided with outwardly extending flanges 25 and 26. Once the several solenoids have been positioned within the longer shell piece 23, the shorter shell piece 24 may be applied as a cap so that flanges 25 and 26 abut, and may be appropriately secured together as by riveting, bolting, welding, or cementing.

The shell pieces 23 and 24, as well as their interconnecting means, may be formed of material having little or no magnetic permeability, or in cases where it is desired to shield the exterior from the escape of magnetic flux, they may be formed of material having a high magnetic permeability. Instead of dividing the rotor shell in twain axially, it may be divided in twain radially, in which event the two halves will have axially extending joints when assembled, and may be held in such assembled position by banding or other appropriate means capable of sustaining the centrifugal force to which the rotor will be subject in use.

At the end of shell piece 23, remote from flange 25, there is provided a pair of slip rings 27 and 28 which, in the event the shell piece is formed of electrically conductive material, may be separated from the shell piece by sub-rings 29 and 30, of appropriate insulating material. The slip ring 27 is connected through a conductor 31 to the free end on the inner course of the solenoid winding for each of the electro magnets 11-22. The slip ring 28 is connected trough a conductor 32 to the free end of the outer course of winding in each of the solenoids 11-22. All 12 solenoids are connected so that the direction of electric current flow is the same in all solenoids. The energizing current is supplied from an external source through conductors 33 and 34 and brushes 35 and 36, in a manner well understood in the art.

The rotor is mounted upon an appropriate frame 37, having opposite stationary stub axles in the form of ferrules 38 and 39 which project toward each other. On the projecting portion of each of ferrules 38 and 39, there is provided an inner race 40 and 41 for each of two ball bearing sets whose outer races 42 and 43 are appropriately mounted to the respective ends of the rotor 10, so that the rotor 10 is free-running, with respect to the frame 37, about an axis concentric with the rotor 10.

In the embodiment shown, the exterior cylindrical surface of rotor 10 serves as a pulley for a drive belt 44 which connects the rotor to a source of power 45, but any other suitable means of driving the rotor in rotation may be utilized.

In the form shown in FIGS. 3-5, the apparatus is intended to concentrate the magnetic flux of the several solenoids radially inward, and to facilitate this each of the solenoids is provided with a core 46 of material having high magnetic permeability. As shown in FIG. 4, the several cores 46 are of squat U-shape, and extend, for the most part, parallel to the axis of the rotor, but at each end the cores are curved so as to provide faces 47 and 48 addressed radially inward. To minimize the radially outward escape of magnetic flux from the several solenoids, they are preferably wound of ribbon-like conductor which is coated with any appropriate electrical insulation. The first course of winding begins at 49, and proceeds in helically wound fashion with the minimum of space between adjacent turns about core 46, to the opposite end thereof, whereupon, without interrupting the continuity of the conductor, the second course is wound helically over the first course, with the pitch of the helix reversed from that in the first course. In this way, any gaps between successive turns in the first course are overlapped by turns in the second course. While the drawings show only two courses of conductor about each core 46, it will be understood that, in practice, there may be many more courses.

With the several solenoids connected through the slip rings to a source of direct current as above-described, it will be understood that all the solenoids 11-22 have the same polar orientation with respect to the axis of rotation of the rotor. For example, all core ends 47 are North poles, and all core ends 48 are South poles.

A tube 50 of circular cross-section is mounted in fixed relationship within the respective ferrules 38 and 39. The tube 50 is preferably made of material having little or no magnetic permeability. The tube 50 is stationary, but the rotor 10 rotates about the axis of the tube 50.

A stationary solenoid 51 is fixedly mounted on the exterior of tube 50 in a position such as to fit, with clearance, into the bight of the squat U-shaped solenoids 11-22. Solenoid 51 may be wound directly on tube 50, but in the form shown, it is wound on a cylindrical core 52 of material having little or no magnetic permeability, and the core 52 is telescoped on tube 50. The stationary solenoid 51 is energized through appropriate leads (not shown) from conductors 33 and 34 or other source of direct current, and is so connected that its magnetic polarity is opposite that of solenoids 11-22, that is to say that when, as aforesaid, the core ends 47 are North poles, the adjacent end of solenoid 51 will be its South pole. Thus, magnetic flux of solenoids 11-22 has an external path, through tube 50, which is coincident with, and in the same direction as, the internal path of magnetic flux in solenoid 51.

Thus, the magnetic field generated by each of the solenoids 11 through 22, as well as that generated by solenoid 51, penetrates the interior of tube 50, and when the rotor is driven in rotation, those magnetic fields rotate collectively about the axis of tube 50. During such rotation, particles of matter within the tube 50 are within the motional electric field generated by the rotating magnetic flux. Such an apparatus has a demonstrable effect in the separation and concentration of fluids. For example, in the de-salinization of water, the $B \times V$ electric field generated by the rotating magnetic fields, acts upon the disassociated ions of the sodium chloride in solution. This is explained by the fact that if the rotor 10 be rotated in the direction shown by the arrows in FIG. 5, the $B \times V$ field tends to drive the positively charged sodium cations toward the center, and tends to drive the negatively charged chlorine anions away from the center of tube 50. Hence, by introducing a flow of saline water at end 54 of tube 50, and by providing a concentric separating tube 55 at end 56 of tube 50, increments of fluid which are concentrated with sodium and depleted of chlorine may be drawn off through the stationary tube 55, while the increments of fluid which are concentrated with chlorine and depleted of sodium may be drawn off through the space between the exterior walls of tube 55 and the interior walls of tube 50.

Another utility of the apparatus shown is that of transmuting hydrogen into helium, in which event tube 55 is omitted and electrodes are provided at opposite ends 54 and 56 of tube 50, so that an electric arc may be established between them. Heretofore, difficulty has been encountered in maintaining the plasma of the arc in a relatively straight path between the electrodes as it ends to wiggle and extinguish itself when it makes contact with one of the confining walls. However, by impressing a $B \times V$ electric field upon such an arc, its path may be confined within controllable limits. The $B \times V$ electric field has the further effect of driving hydrogen protons toward the center of the tube, and driving electrons away from the center of the tube. Add one neutron to a hydrogen atom nucleus, and there is produced the isotope known as Dueterium; add one more neutron to the Dueterium nucleus, and it becomes Tritium; add one more proton to the Tritium nucleus, and it becomes Helium.

Figure 6:
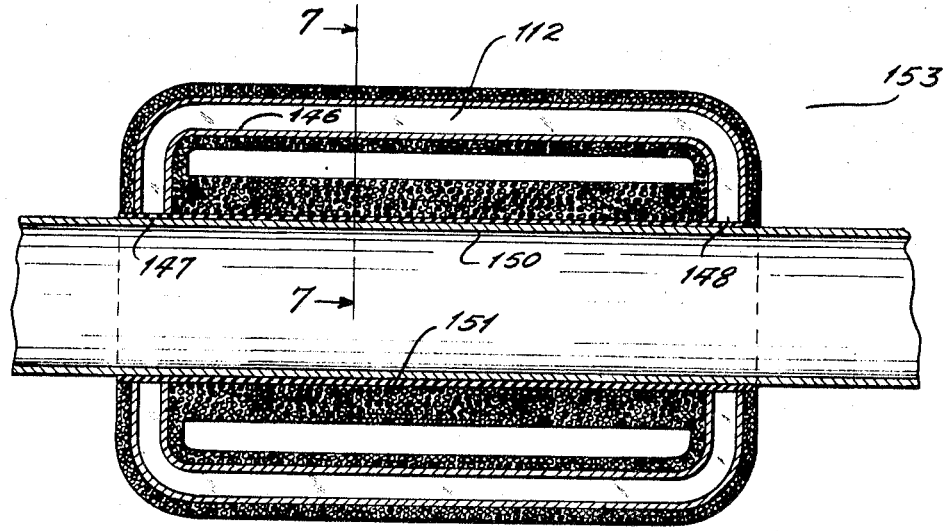
FIG. 6 is a sectional view taken along a diametric plane of a stationary form of apparatus similar to that shown in FIGS. 3, 4, and 5, but wherein the magnetic flux field is rotated electromagnetically by phase displacement.
Figure 7:
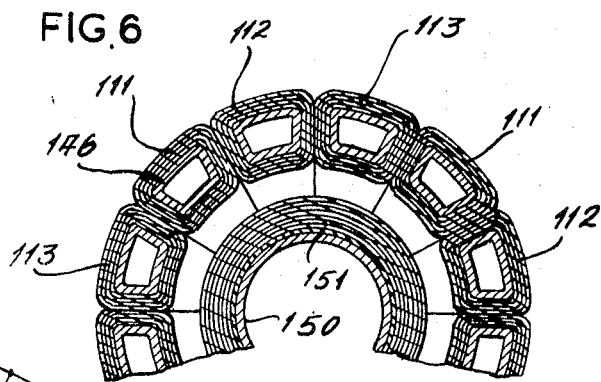
FIG. 7 is a sectional view taken along line 7—7 of FIG. 6.
Figure 8:
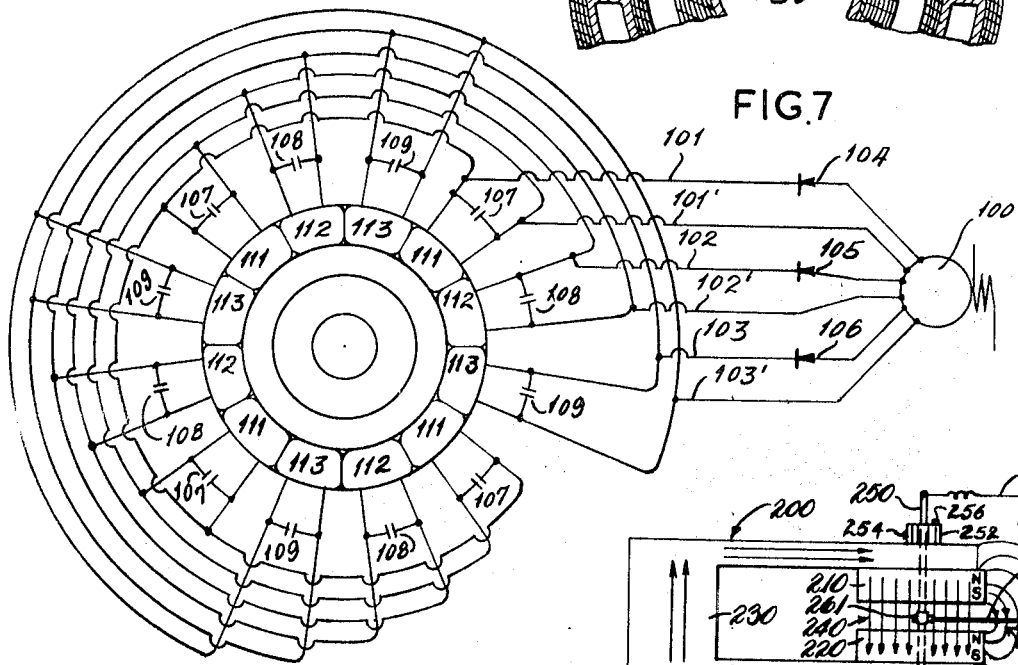
FIG. 8 is a wiring diagram for the apparatus shown in FIGS. 6 and 7.

A third embodiment of the apparatus is shown in FIGS. 6, 7, and 8. With the significant exception that the embodiment of FIGS. 6, 7, and 8 has no moving mechanical parts, its organization is, in general, quite similar to that shown in FIGS. 4 and 5, and hence the last two digits of the reference characters utilized in the previous embodiment. As shown in FIG. 6, a cylindrical tube 150 has a solenoid 151 wound on the exterior thereof, and is energized with direct current from a suitable source through leads 153. A plurality of squat U-shaped solenoids 111, 112, and 113, of keystone-shaped cross-section, of which there are four each or any multiple of four, are wound as described in connection with the previous embodiment, and securely mounted in any suitable way with their pole faces 147 and 148 contiguous with, and addressed toward the axis of, tube 150. In this embodiment, however, the several squat U-shaped solenoids 111, 112, and 113, have cores which are made of material having little or not magnetic permeability, such as tubes 146 of paperboard wound to a keystone shape with hollow interior. As in the previous embodiment, the magnetic polarity of solenoid 151 is opposite that of the solenoids 111, 112, and 113, which is to say that if ends 147 of the solenoids 111–113 are the North poles thereof, the adjacent end of solenoid 151 is its South pole, so that the external magnetic flux path from solenoids 111–113 is coincident with, and in the same direction as, the internal flux path of solenoid 151.

In the embodiment shown in FIGS. 6–8, the several squat U-shaped solenoids 111, 112, and 113 are energized with non-interconnected three-phase alternating current, each phase of which has been half-wave rectified to produce direct current pulsating at alternate half cycles. One phase of the alternating current is connected to all solenoids 111; another phase of the alternating current is connected to all solenoids 112; and the third phase of the alternating current is connect to all solenoids 113, as shown in the wiring diagram of FIG. 8, where a three-phase alternator 100 is provided with six leads arranged in three pairs, to wit: leads 101 and 101' for the first phase, leads 102 and 102' for the second phase, and leads 103 and 103' for the third phase. The respective phases are not electrically interconnected. In each of leads 101, 102, and 103, there is a rectifier 104, 105, and 106, respectively. Leads 101 and 101' serve all four of solenoids 111; leads 102 and 102' serve all four of solenoids 112; and leads 103 and 103' serve all four of solenoids 113. Across leads 101 and 101', between the rectifier 104 and the respective solenoids 111, there is provided a capacitor 107. Such capacitor is to coordinate the capacity and inductance of input, and to neutralize the effect of induction in solenoids 111 by adjacent solenoids during the off half-cycle of energization. Likewise, a capacitor 108 is connected between leads 102 and 102', and a capacitor 109 is connected between leads 103 and 103'. It will be apparent to those skilled in the art that since the four solenoids of like phase are arranged in quadrature with each other, and since solenoids 111 will reach their peak of magnetic flux 120° ahead of solenoids 112 reaching their peak flux, and the latter 120° ahead of solenoids 113 reaching their peak flux, a revolving magnetic field is created. Due to the rectification of the alternating current, and the consequent utilization of the half cycles which all flow in the same direction, there will be no reversal of the direction of magnetic flux generated by any of solenoids 111, 112, and 113, and hence, as in the case of the previous embodiment, the external path of all magnetic flux generated in the solenoids 111, 112, and 113 is coincident with, and in the same direction as, the internal flux generated by direct current energization of solenoid 151. When such an arrangement is supplied with alternating current at high frequency, such as a thousand cycles per second, the same results are achievable with this embodiment as with the previous embodiment but without movement of any mechanical parts.

Figure 9:
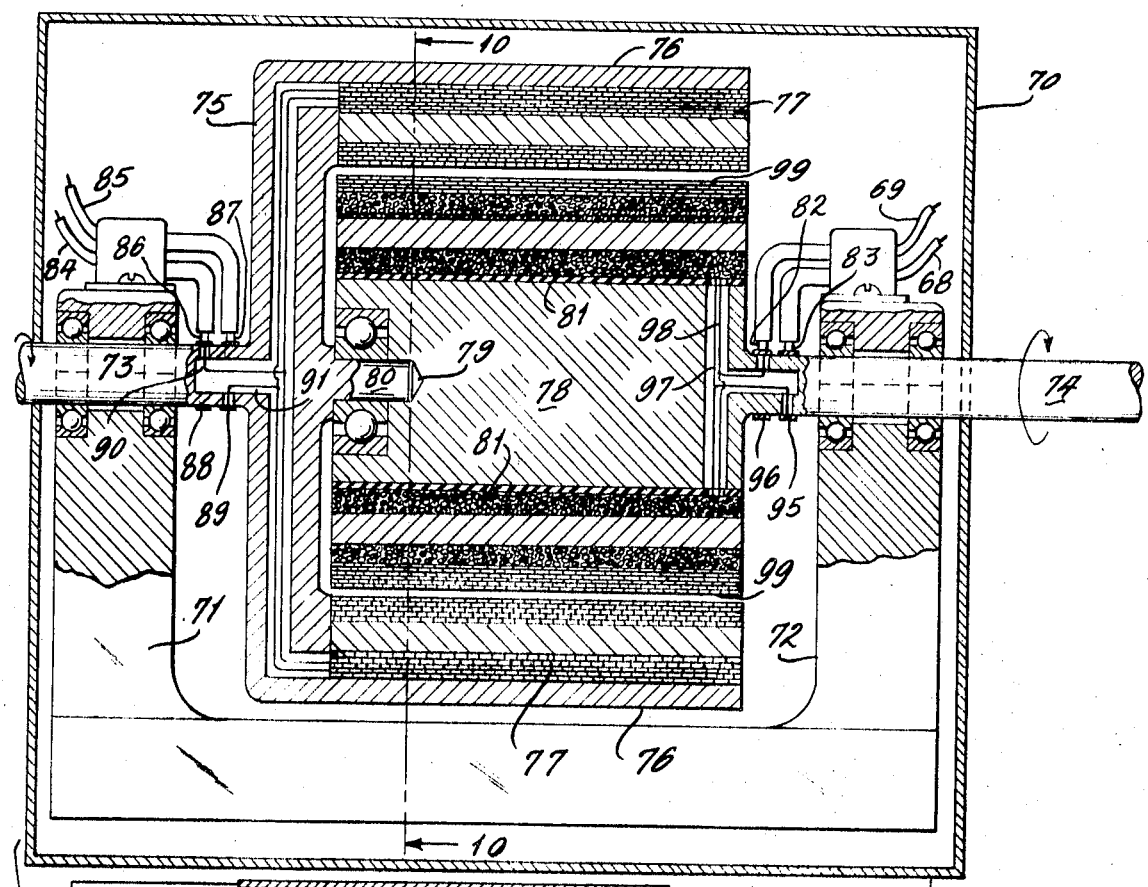
FIG. 9 is a longitudinal sectional view of an apparatus having a plurality of rotors for generating a B × V electric field.
Figure 10:
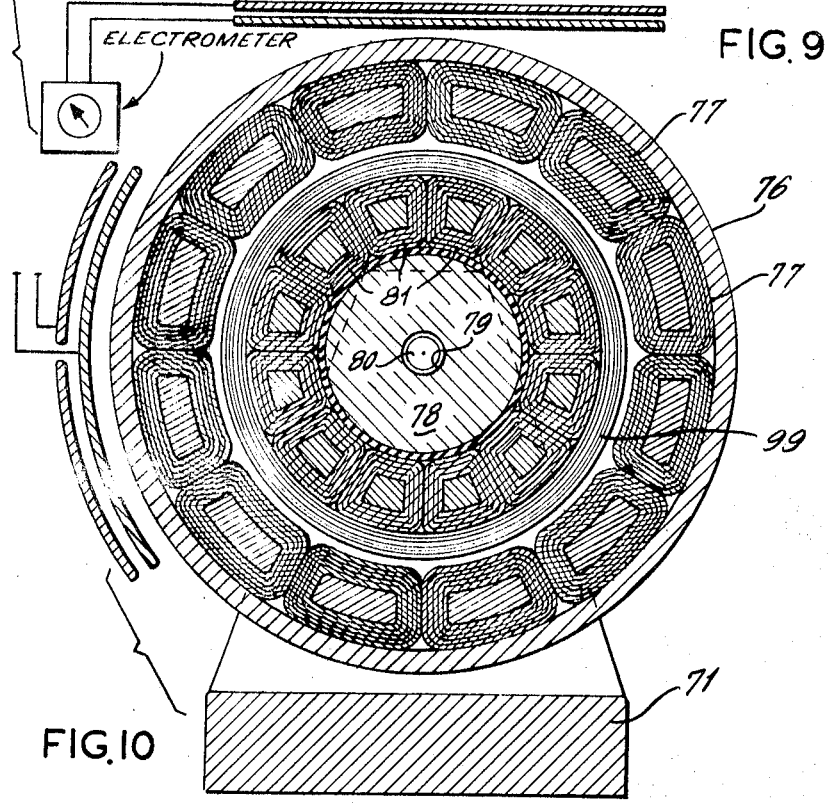
FIG. 10 is a sectional view taken along line 10—10 of FIG. 9.

For the purpose of illustrating the effect of the $B \times V$ electric field, and segregating that effect from the effect of stray magnetic or electrostatic forces, reference may be had to FIGS. 9 and 10. The device there shown is intended to be encased in an electrically grounded box 70 of material which has a high magnetic permeability, and which also has the property of electrical conductivity for shielding electrostatic fields.

Within the box 70, there is a compound rotor machine, wherein the respective rotors are driven in opposite directions. In a suitable frame having spaced pedestals 71 and 72, there is mounted a shaft 73 and an independent shaft 74. Both shafts 73 and 74 may be driven from a single source of power, and are preferably driven at the same rotational speed, but in opposite senses. A yoke 75 is fixedly mounted to shaft 73 for rotation with it. The yoke is cup-shaped with cylindrical skirt 76. About the inner periphery of the skirt 76, a plurality os solenoidal electro magnets 77 are fixedly mounted thereto. The several electro magnets extend parallel with the common axis of rotation of shafts 73 and 74, and are of the same polar orientation with respect to those shafts. The several electro magnets 77 have identical solenoids wound, in the manner previously described, about identical cores of material having high magnetic permeability. The solenoids of the several electro magnets 77 are energized from a suitable source of direct current through conductors 84 and 85, brushes 86 and 87, slip rings 88 and 89, and conductors 90 and 91. The respective solenoids 76 are preferably connected in parallel circuit relationship, but, if desired, may be in series so long as uniform polar orientation is maintained.

Shaft 74 is provided with a hub 78 having a coaxial bore 79, into which is rotatably fitted a pilot 80 projecting concentrically from shaft 73. On the outer periphery of hub 78, there is fixedly mounted a plurality of electro magnets 81, each of which is an identical solenoid, and each of which has an identical core of material having high magnetic permeability. As in the previous case, the several solenoids 81 are all energized so as to have the same polar orientation with respect to their axis of rotation. Each of the solenoids is energized from a suitable source of direct current through conductors 68 and 69, brushes 82 and 83, slip rings 95 and 96, and conductors 97 and 98. All of the solenoids 81 are preferably connected in series circuit relationship, but, if desired, may be in parallel.

If desired, and as shown, the several solenoids 81 may be surrounded by a simple solenoid 99 wound helically thereabout and electrically connected in parallel or series relationship with solenoids 81 and to conductors 97–98 so that the current flow through solenoid 99 is in the same direction as through solenoids 81. Thus the winding 99 serves the dual purpose of boosting the magnetic fields generated by solenoids 81 and of mechanically binding the latter to the surface of hub 78.

When, as contemplated, the shafts 73 and 74 are driven in rotation simultaneously, but in opposite directions, the solenoids 77 which rotate with shaft 73 have opposite magnetic polar orientation to those (81) which rotate with shaft 74. The several solenoids 77 are preferably designed to create external magnetic flux fields of flux density approximately equal and opposite to those created by electro magnets 81 and 99, but by the principle of superposition ("Elec. & Mag.", by Ralph W. Winch, 1963 Ed., p. 202), each flux field acts as if the other were not present. Despite the fact that the flux fields created by the responsive series of electro magnets 77 and 81 and 89 are oppositely directed, since their rotation is in opposite senses, their resultant effect, insofar as concerns the generation of a $B \times V$ electric field, is cumulative. Accordingly, the external $B \times V$ electric field is intensified at the exterior of the device, and its effect on the outside of shielding box 70 is demonstrable, even though the resultant magnetic flux density there is approximately zero. Such demonstration might be through a capacitor and electrometer as shown in FIG. 9, for example.

In order to achieve the maximum flux density and hence the maximum $B \times V$ electric field intensity, it is desirable to take measures which keep the apparatus cool. This may involve resort to such means as: winding the several solenoids with so-called "super-conductors" such as that known commercially as "Supercon"; or refrigerating the apparatus as by immersing it in a bath of liquid helium which is capable of maintaining a temperature of approximately 4° Absolute.

While several illustrative embodiments of the invention have been disclosed in detail, it is not to be understood that the invention is limited to those embodiments. On the contrary, the principles of the invention are susceptible of application in a vast variety of forms without departing from the spirit of the invention or the scope of the appended claims. The apparatus defined in the following claims is believed by the applicant to demonstrate his unique theory disclosed above.

What is claimed is:

1. Apparatus for generating an electric field, comprising:
   a frame;
   a cylindrical rotor;
   a shaft journalled on the frame and supporting the rotor for rotation about is longitudinal axis;
   a plurality of electro magnets, each of which is an identical solenoid having a core formed of a material having a high magnetic permeability, the electro magnets being fixedly mounted on the rotor with each electromagnet extending parallel to the axis of rotation thereof,
   means to energize the solenoids of the electro magnets from a direct current source, the solenoids being energized so as to maintain a uniform polar orientation; and
   an enclosure surrounding the frame and the rotor, the enclosure being formed of an electrically conductive material the enclosure being grounded.

2. Apparatus according to claim 1 wherein the rotor is a hollow cylindrical rotor, the electromagnets being affixed to the inner cylindrical surface of the rotor.

3. Apparatus according to claim 1 wherein the solenoids are connected in parallel circuit relationship.

4. Apparatus for demonstrating magnetic phenomena comprising:
   a frame;
   a cylindrical rotor;
   a shaft journalled on the frame and supporting the rotor for rotation about its longitudinal axis;
   a plurality of electro magnets, each of which is an identical solenoid having a core formed of a material having a high magnetic permeability, the electro magnets being fixedly mounted on the rotor with each electro magnet extending parallel to the axis of rotation thereof,
   means to energize the solenoids of the electro magnets from a direct current source, the solenoids being energized so as to maintain a uniform polar orientation;
   an enclosure surrounding the frame and the rotor, the enclosure being formed of an electrically conductive material, the enclosure being grounded; and
   means surrounding at least a portion of the enclosure to detect and measure the electric field generated during rotation of the energized rotor.

5. Apparatus for demonstrating magnetic phenomena, comprising:
   a U-shaped yoke of highly permeable magnetic material;
   a pair of permanent magnets mounted in axial alignment between the ends of the yoke, one magnet being mounted to each leg of the yoke;
   an electrically conductive non-magnetic rod extending axially through the magnets;
   a stiff conductor mounted at one end to the rod for rotation relative to the yoke in a plane perpendicular to the rod and intermediate the magnets, the conductor extending a sufficient distance beyond the magnets so that its other end is located at a point where the magnetic field from the magnets falls to approximately zero intensity;
   a galvanometer; and
   circuit means connecting the ends of the conductor to the galvanometer to measure current flow through the conductor.

6. Apparatus according to claim 5 wherein the magnets are rotatably mounted to the yoke for rotation about the axis of the rod, and where the magnets are axially magnetized and adjacent faces are of opposite polarity.

* * * * *